US012782574B2

(12) United States Patent
Durigneux et al.

(10) Patent No.: US 12,782,574 B2
(45) Date of Patent: Nov. 3, 2026

(54) TIME-OF-FLIGHT OBJECT DETECTION CIRCUITRY AND TIME-OF-FLIGHT OBJECT DETECTION METHOD

(71) Applicant: Sony Semiconductor Solutions Corporation, Atsugi (JP)

(72) Inventors: Antoine Durigneux, Stuttgart (DE); David Dal Zot, Stuttgart (DE); Varun Arora, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 731 days.

(21) Appl. No.: 18/037,084

(22) PCT Filed: Nov. 18, 2021

(86) PCT No.: PCT/EP2021/082126
§ 371 (c)(1),
(2) Date: May 16, 2023

(87) PCT Pub. No.: WO2022/106531
PCT Pub. Date: May 27, 2022

(65) Prior Publication Data

US 2024/0004075 A1 Jan. 4, 2024

(30) Foreign Application Priority Data

Nov. 23, 2020 (EP) .................................... 20209254

(51) Int. Cl.
*G01C 3/08* (2006.01)
*G01S 7/481* (2006.01)
(Continued)

(52) U.S. Cl.
CPC ............ *G01S 17/89* (2013.01); *G01S 7/4814* (2013.01); *G01S 7/4816* (2013.01); *G06V 10/34* (2022.01);
(Continued)

(58) Field of Classification Search
CPC ...... G01S 17/89; G01S 7/4814; G01S 7/4816; G06V 20/59; G06V 20/70; G06V 10/74;
(Continued)

(56) References Cited

U.S. PATENT DOCUMENTS 9,928,434 B1 * 3/2018 Chan ...................... G06Q 40/08
2014/0125474 A1 * 5/2014 Gunaratne ............ B60Q 9/008
340/439
(Continued)

FOREIGN PATENT DOCUMENTS

CN 106997586 A * 8/2017 ........... G06T 7/0002
CN 109685026 A 4/2019
(Continued)

OTHER PUBLICATIONS

Dan Wang et al., Detecting Driver Use of Mobile Phone Based on In-Car Camera, 2014 Tenth International Conference on Computational Intelligence ans Security, Nov. 15, 2014.
(Continued)

*Primary Examiner* — Mark Hellner
(74) *Attorney, Agent, or Firm* — XSENSUS, LLP

(57) ABSTRACT

The present disclosure generally pertains to time-of-flight object detection circuitry for detecting a mobile phone in a hand of a user of a vehicle, the time-of-flight object detection circuitry being configured to: detect the mobile phone in the hand of the user based on a predefined reflectivity pattern being indicative of the mobile phone being at least partially located in the hand.

19 Claims, 7 Drawing Sheets

(51) Int. Cl.

| | |
|---|---|
| ***G01S 17/89*** | (2020.01) |
| ***G06V 10/34*** | (2022.01) |
| ***G06V 10/44*** | (2022.01) |
| ***G06V 10/74*** | (2022.01) |
| ***G06V 20/59*** | (2022.01) |
| ***G06V 20/70*** | (2022.01) |
| ***G06V 40/10*** | (2022.01) |
| *G06V 10/143* | (2022.01) |

(52) U.S. Cl.
CPC .............. *G06V 10/44* (2022.01); *G06V 10/74* (2022.01); *G06V 20/59* (2022.01); *G06V 20/70* (2022.01); *G06V 40/10* (2022.01); *G06V 10/143* (2022.01)

(58) Field of Classification Search
CPC ...... G06V 10/44; G06V 10/34; G06V 10/143; G06V 40/10
See application file for complete search history.

(56) References Cited

U.S. PATENT DOCUMENTS

| | | | | |
|---|---|---|---|---|
| 2015/0286885 | A1* | 10/2015 | Bulan .................... | G06V 10/50 382/104 |
| 2017/0316581 | A1 | 11/2017 | Ewert | |
| 2018/0033145 | A1* | 2/2018 | Schoenberg ............ | G06T 7/514 |
| 2019/0171892 | A1 | 6/2019 | Barth et al. | |
| 2019/0213406 | A1 | 7/2019 | Porikli | |
| 2020/0012872 | A1* | 1/2020 | Autran ................ | B60W 50/082 |

FOREIGN PATENT DOCUMENTS

| | | | | | |
|---|---|---|---|---|---|
| CN | 210514609 | U | * | 5/2020 | ............. G01S 7/497 |
| JP | 2013037675 | A | | 2/2013 | |
| JP | 2016529491 | A | | 9/2016 | |
| JP | 2016208098 | A | | 12/2016 | |
| JP | 2017111508 | A | | 6/2017 | |
| WO | WO-2020161610 | A2 | | 8/2020 | |

OTHER PUBLICATIONS

Siddharth et al., Driver hand localization and grasp analysis: A vision-based real-time approach; 2016 IEEE 19th International Conference on Intelligent Transportation Systems; Nov. 1, 2016.

International Search Report and Written Opinion mailed on Mar. 3, 2022, received for PCT Application PCT/EP2021/082126, filed on Nov. 18, 2021, 12 pages.

Weyers et al., "Action and Object Interaction Recognition for Driver Activity Classification", 2019 IEEE Intelligent Transportation Systems Conference (ITSC), Oct. 27-30, 2019, pp. 4336-4341.

Köpüklü et al: "Driver Anomaly Detection: A Dataset and Contrastive Learning Approach", arxiv.org, Cornell University Library, 201 Olin Library Cornell University, arXiv:2009.14660v1, Sep. 30, 2020, pp. 1-10.

Ohn-Bar et al: "Driver hand activity analysis in naturalistic driving studies: challenges, algorithms, and experimental studies", Journal of Electric Imaging, vol. 22, No. 4, Oct.-Dec. 2013, pp. 041119-1-041119-10.

* cited by examiner

TIME-OF-FLIGHT OBJECT DETECTION CIRCUITRY AND TIME-OF-FLIGHT OBJECT DETECTION METHOD

CROSS-REFERENCE TO RELATED APPLICATIONS

The present application is based on PCT filing PCT/EP2021/082126, filed Nov. 18, 2021, and claims priority to EP Application Serial No. 20209254.0, filed Nov. 23, 2020, the entire contents of each are incorporated herein by reference.

TECHNICAL FIELD

The present disclosure generally pertains to time-of-flight object detection circuitry and a time-of-flight object detection method.

TECHNICAL BACKGROUND

Generally, methods for detecting a mobile phone being used e.g. by a driver of a vehicle are generally known. However, known methods may pertain to detecting the mobile phone from outside of the vehicle, e.g. in order to fine the driver.

On the other hand, in-cabin mobile phone detection devices may use RGB images, for example.

Furthermore, time-of-flight (ToF) imaging devices are known. For example, a depth or a distance may be determined based on a roundtrip delay (i.e. a time of flight) of emitted light, wherein the roundtrip delay may be determined based on a direct measurement of the time (e.g. a time at which the light is emitted compared to a time at which reflected light is received taking the speed of light into account), to which it may be referred as direct time-of-flight (dToF), or based on an indirect measurement of the time by measuring a phase shift of modulated light, to which it may be referred to as indirect time-of-flight (iToF).

Although there exist techniques for detecting a mobile phone being used in a cabin of a vehicle, it is generally desirable to provide time-of-flight object detection circuitry for detecting a mobile phone in a hand of a user of a vehicle, and a time-of-flight object detection method for detecting a mobile phone in a hand of a user of a vehicle.

SUMMARY

According to a first aspect the disclosure provides time-of-flight object detection circuitry for detecting a mobile phone in a hand of a user of a vehicle, the time-of-flight object detection circuitry being configured to:

detect the mobile phone in the hand of the user based on a predefined reflectivity pattern being indicative of the mobile phone being at least partially located in the hand.

According to a second aspect the disclosure provides a time-of-flight object detection method for detecting a mobile phone in a hand of a user of a vehicle, the time-of-flight object method comprising:

detecting the mobile phone in the hand of the user based on a predefined reflectivity pattern being indicative of the mobile phone being at least partially located in the hand.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
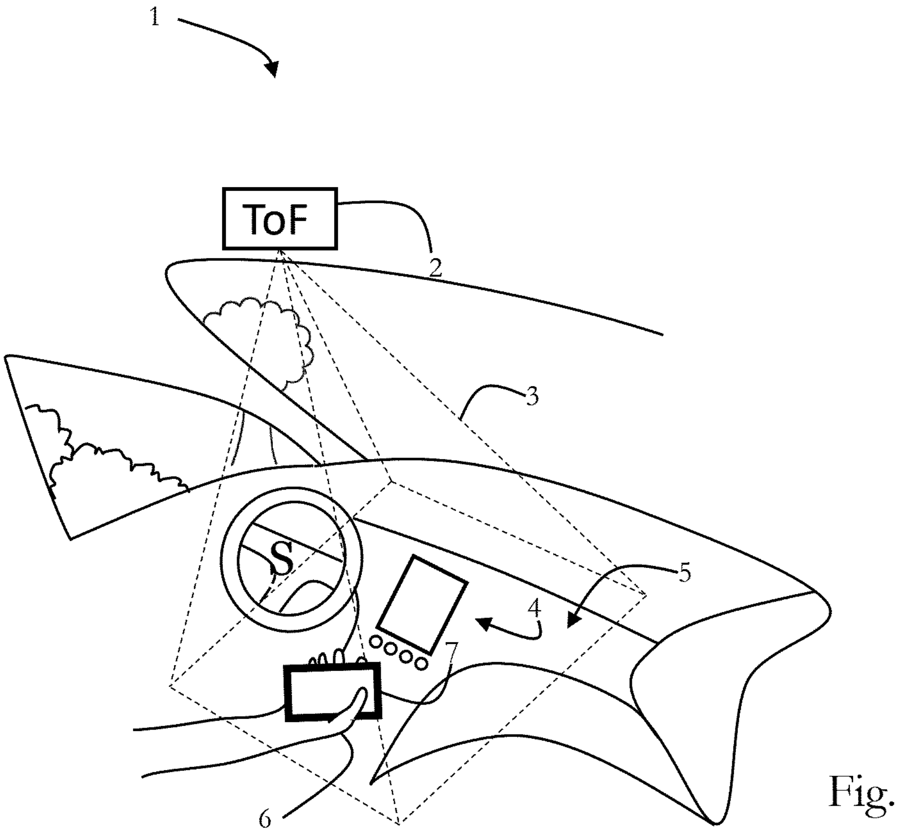
FIG. 1 schematically depicts a cabin of a vehicle.

Before a detailed description of the embodiments under reference of FIG. 1 is given, general explanations are made.

As mentioned in the outset, time-of-flight object detection methods are generally known.

However, it has been recognized that it may be desirable to warn a driver of a vehicle or to activate a safety-related function based on whether the driver (or user) of the vehicle holds a phone (or anything else (which might distract the driver)) while driving.

Furthermore, it has been recognized that, in case of autonomous driving, it may be desirable that an infotainment system may be accessed based on a user in the vehicle holding a phone (or anything else which may be able to access or control the infotainment system).

Also, it has been recognized that known mobile phone detection devices may be inexact since they may not be able to distinguish a phone from a background, for example. This might be the case when a light condition (e.g. low light, night, daylight) is not suitable for the used system, e.g. when it is night, but an RGB camera is used. Therefore, it has been recognized that it is desirable to provide a detection of an in-cabin mobile phone use for various light conditions (or completely independent of light conditions), such that it has been recognized that time-of-flight imaging may be used for detecting a mobile phone.

It has further been recognized that a more exact detection of the mobile phone may be achieved by detecting a hand of the user and/or the mobile phone in connection with the hand, e.g. when it is recognized that the mobile phone is at least partially located in the hand, such that a false recognition of only the mobile phone (wherein the driver does not use the phone) may be avoided.

Therefore, it has been recognized that a time-of-flight image may be used since a mobile phone display may have a known reflectivity and in time-of-flight, additionally to depth/distance, reflectivity may also be determined, and that the mobile phone detection may be carried out based on a combination of reflectivity of the mobile phone and depth/ distance of the mobile phone to the hand (also the reflectivity of the hand may be taken into account, e.g. the reflectivity of skin and/or if the user wears a reflective watch (e.g. a smart watch), the hand may be determined based on this reflectivity).

Therefore, some embodiments pertain to time-of-flight object detection circuitry for detecting a mobile phone in a hand of a user of a vehicle, the time-of-flight object detection circuitry being configured to: detect the mobile phone in the hand of the user based on a predefined reflectivity pattern being indicative of the mobile phone being at least partially located in the hand.

As indicated above, time-of-flight may refer to any method for generating a depth map/image of a scene (e.g. an object), such as indirect time-of-flight, direct time-of-flight, or the like. Furthermore, according to some embodiments, additionally to the depth map/image, the time-of-flight object detection circuitry may also be configured to determine reflectivity of the scene, e.g. by measuring an amount of detected light compared to an amount of emitted light.

In some embodiments, the emitted light includes infrared light, such that the reflectivity of the object in an infrared spectrum is obtained, for example.

However, the present disclosure is not limited to a direct measurement of reflectivity. For example, other (physical) parameters may be measured as well, which may be indicative of the reflectivity, such as extinction, absorption, and/or the like.

Circuitry may pertain to any kind of processor, such as a CPU (central processing unit), GPU (graphic processing unit), FPGA (field programmable gate array), or the like, or any kind of computer, server, camera (system), or the like, or any combination thereof, e.g. two computers, a server and a computer, a CPU and a GPU, or the like.

Further, an object may be detected by the object detection circuitry, wherein the object may include a mobile phone, a tablet, or the like, which has a predefined (specific) reflectivity (signature) (e.g. in the infrared range), e.g. since the mobile phone may have a specific display or a specific coating on the display which may have a specific reflectivity (signature/characteristic), or due to a material of the mobile phone.

According to some embodiments, the mobile phone can be detected when it is at least partially located in the hand of the user, for example in case a warning to the user should be issued (e.g. if the user is a driver of a vehicle and the user should be warned about the usage of a mobile phone while driving), or a specific data connection should be established when the user is holding the mobile phone (e.g. when it is recognized that the user wants to make a call).

In some embodiments, the time-of-flight object detection circuitry is utilized to detect the mobile phone in the hand of the user when the user is within or on a vehicle, wherein the present disclosure is not limited to any kind of vehicle, such as a car, a bicycle, a motorcycle, or the like. Also, the time-of-flight object detection circuitry may be envisaged within a train (or ship, or airplane, or the like), e.g. in a resting compartment, such that, when it is recognized that the user wants to make a call, the user is notified (e.g. as a message on the mobile phone) that she or he is not allowed to make the call in the resting compartment.

The ToF object detection circuitry may be configured to generate a phone detection status, as will be discussed further below, based on an in-cabin ToF equipment including a ToF sensor configured to acquire confidence and depth image. The ToF equipment may be part the ToF object detection circuitry or vice versa, or may be two different entities. For example, an external device may form the ToF object detection circuitry. For example, a remote server may form the ToF object detection circuitry and the necessary ToF data may be transmitted to the server via an air interface.

The phone detection status may be based on an identification of a hand in a field of view of the ToF sensor in order to determine a hand position. For example, a (enlarged, i.e. a part of the field of view) bounding box or ROI (region of interest) relating to the hand may be defined.

As indicated above, in some embodiments, the ToF object detection circuitry is configured to: detect the mobile phone in the hand of the user based on a predefined reflectivity pattern being indicative of the mobile phone being at least partially located in the hand.

As already discussed, the mobile phone or its display may have known reflectivity. A reflectivity pattern may include a steady distribution of reflectivity within a predetermined area (e.g. on the display), such as the same reflectivity or a reflectivity within a predetermined threshold. A reflectivity pattern may also include different reflectivities within the predetermined area. For example, if the display of the mobile phone is determined as the predetermined area, different coatings may be applied, such that different reflectivities may arise from the different coatings. For example, in case a front camera is considered as part of the display, the front camera may be coated differently or not coated at all.

A reflectivity image (for estimating the reflectivity of an object (or e.g. of the ROI-hand+phone)) may be obtained based on the following non-limiting formula:

$$\text{Reflectivity}=(\text{Depth}*\text{Depth}*\text{Confidence})/(\text{Predetermined Value}),$$

wherein the predetermined value may be a constant, a variable, model-based, be saved in a characteristic map, or the like.

Another way of determining the reflectivity according to the present disclosure is to use, instead of a ToF sensor, a color sensor, e.g. with an 840 nm filter, a 940 nm filter, or the like. A first image may be taken with a light source ON (without a filter), and a second image may be taken with the light source OFF (with the filter). The first and the second image may be compared for determining the reflectivity of the objects in the field of view of the color sensor.

If a part of the hand (e.g. a finger) covers a part of the display, the known reflectivity of the display may be interrupted by the finger, such that a reflectivity pattern may arise from which it can be concluded that the part of the hand covers the part of the display.

In some embodiments, the ToF object detection circuitry determines that the predefined reflectivity is interrupted, such that the reflectivity pattern emerges, whereas in other embodiments, the reflectivity pattern includes first reflectivity being indicative of the display and second reflectivity being indicative for the hand (e.g. a skin reflectivity, a glove material reflectivity, or the like).

Hence, in some embodiments, the hand may be first detected and the mobile phone may be detected in the vicinity of the hand.

As indicated above, the mobile phone is detected to be in the hand when the reflectivity pattern is recognized which indicates that the mobile phone is at least partially located in the hand.

Hence, the mobile phone may partially not be located in the hand, as well, as a mobile phone which is larger than a hand may be only positioned in the palm of the hand, for example.

In some embodiments, the hand is detected, even if no part of the hand covers or surrounds the mobile phone, whereas in other embodiments, the hand is detected by detecting that at least a part of the hand covers or surrounds the mobile phone.

In some embodiments the predefined reflectivity pattern is indicative of the mobile phone being at least partially surrounded by at least a part of the hand.

Hence, it may be recognized or detected that the user grasps the mobile phone, for example on the edges, but the display may not be covered, whereas this may depend on an angle of view in which the ToF depth image is taken.

Hence, in some embodiments the predefined reflectivity pattern is indicative of the mobile phone being at least partially occluded by at least a part of the hand. Hence, the mobile phone may be partly occluded, even if the part of the hand is not in contact with the display, but depending on the angle of view, the reflectivity pattern may change.

However, in some embodiments, the mobile phone is partly occluded when the hand is in contact with the display.

In order to detect the mobile phone in the hand of the user, in some embodiments, the time-of-flight object detection circuitry is further configured to: generate a labeled time-of-flight image.

For example, based on ToF data, which may be indicative for an image or a depth map, a labeled image may be generated. An image may pertain to any kind of data structure, which is based on a ToF acquisition process. Hence, the present disclosure is not limited to the image being visible since the only requirement may include that the data structure may be processed by the ToF object detection circuitry. For example, the image may be input into an artificial intelligence, hence, the ToF data may be compiled in order to suit the requirements of the artificial intelligence in terms of data structure. In some embodiments, however, the ToF data may be directly (without altering) input into the ToF object detection circuitry. For example, the ToF object detection circuitry and a ToF measurement circuitry or a ToF acquisition circuitry may have common parts such that they may be intrinsically configured to use the same data structure. For example, an artificial intelligence may be provided on the same chip (e.g. processor) as an image processing unit, or the like.

The image may be labeled, for example, in that image elements (e.g. pixels) which have a predefined depth are removed, marked, or the like.

Generally, each image element may be marked based on at least one of the following: pixel saturation, pixel confidence (e.g. high confidence may be marked without limiting the present disclosure in that regard), pixel reflectivity (e.g. background range, hand range, mobile phone range), pixel neighborhood noise variance.

In a non-limiting example, a pixel may be labeled based on a combination of at least two of the above-mentioned conditions, e.g. based on a pixel saturation and a pixel neighborhood noise variance.

For example, if a saturation is below a predetermined threshold, it may be determined that this pixel represents a background but neither the hand nor the mobile phone, such that the pixel may be marked to be disregarded, without limiting the present disclosure in that regard, in particular since the saturation may also be above a predetermined threshold in order to mark the pixel and/or in order to determine that it is indicative of the hand or the phone.

Regarding the pixel confidence, as it is generally known for the case of indirect ToF, the confidence may become high, if the I and Q values, which are generally known to the skilled person, are high since the confidence may be based on a (Pythagorean) addition of I and Q, for example. Hence, a high confidence may be indicative of the object to be detected (e.g. the hand or the phone), such that such pixels may be marked to belong to a region of interest, for example. However, high confidence may also be indicative of an object blocking the line of sight.

A pixel may be marked based on its reflectivity. As discussed herein, a mobile phone (e.g. its display) may have unique reflectivity, such that pixels which are indicative of the mobile phone may be marked accordingly. Furthermore, a background may have a diffuse reflectivity or no reflectivity at all, such that a diffuse reflectivity distribution may indicate the background, for example. Moreover, skin may also have unique reflectivity characteristics, such that hand pixels (pixels indicating the hand) may be marked accordingly.

In view of pixel neighborhood noise variance, for example, a statistical variance in noise of directly or indirectly neighboring pixels may be taken into account and the pixel may be marked based on this variance. However, the present disclosure is not limited to a variance since any statistical measure for noise may be envisaged, e.g. a root-mean-square deviation, a significance, or the like.

Hence, based on the labeled image, a region of interest may be determined which may be indicative of the hand and the mobile phone.

However, in some embodiments, a usability image is generated, in which the pixels having a depth above or below a predetermined threshold are removed. Based on the usability image, the labeled image is generated based on at least one of the above-mentioned conditions (i.e. pixel saturation, pixel confidence, pixel reflectivity, pixel neighborhood noise variance).

For obtaining the usability image, a reflectivity image may be generated, e.g. based on the above-given formula for reflectivity, based on a measurement of the reflectivity (e.g. incoming light amount versus emitted light amount), or the like.

The usability image includes usable pixels by defining a background depth in relation to the hand and removing pixels having a depth information deeper (or lower) than the background depth. In some embodiments, also saturated pixels (although they might lie in the background) are kept and/or pixels with a low confidence (e.g. confidence below a predetermined threshold) but with a depth close to the hand (e.g. within a predetermined range) are kept as well.

In some embodiments, pixels of the usability image being in the neighborhood of the hand (i.e. a predetermined number of pixels distant from pixels indicating the hand) are kept, since these pixels may be indicative of the mobile phone.

In other words: In some embodiments, the time-of-flight object detection circuitry is further configured to: remove image elements of a time-of-flight image having a predefined reflectivity for generating the labeled time-of-flight image.

In some embodiments, the time-of-flight object detection circuitry is further configured to: apply a morphological operation to the labeled time-of-flight image for generating an object detection image.

Generally, the morphological operation is applied in for generating connected groups of pixels, for example based on surrounding pixel label information.

Hence, if a pixel has a same or a similar label as its neighboring pixel (e.g. respective pixel label values are within a predetermined range), the pixels may be connected.

Thereby, mislabeled pixels may be removed or corrected ("cleaned out") and contours of the region of interest may be pruned.

Hence, in some embodiments the time-of-flight object detection circuitry is configured to: apply the morphological operation to an image element of the labeled time-of-flight image based on at least one surrounding image element for generating the object detection image.

The morphological operation may be based on at least one of the following: erosion and dilation.

Erosion may be used to remove (small) noise components from the mislabeled pixels and to reduce a number of pixels on a contour of the region of interest. For example, an erosion efficiency may be dependent on a label value of the pixel (or on a combination of the label values (e.g. pixel saturation and pixel neighborhood noise variance, or pixel reflectivity and pixel confidence, or the like).

Dilation may be used to connect larger groups of pixels together and to fill small holes. For example, a pixel may have been erroneously removed although it would have been indicative of the display of the mobile phone (e.g. due to a wrong removal in the phase of generating the usability image or due to a measurement error). Based on the dilation, this pixel may be recovered based on the neighboring pixels, for example.

In some embodiments, each connected group of pixels, to which it may also referred to as "detected component", is indicative of a component which may then be used in the subsequent detection process.

To the image being generated based on the morphological operation, it is referred to as object detection image herein.

In some embodiments, the time-of-flight object detection circuitry is further configured to: detect at least one hand feature being indicative of the hand in the object detection image.

The hand feature may be indicative of a finger, a hand palm, a thumb, a finger nail, or the like and may be detected based on known feature detection methods.

In some embodiments, each connected group of pixels (i.e. each component) may be analyzed.

Based on this analysis, at least one (shortest) distance relative to the detected hand feature may be defined as potential phone component (phone candidate).

In some embodiments, each detected component may be analyzed with at least one statistical method and a list of detected components may be generated.

In some embodiments, a hand position is based on a hand palm center position. For example, the list of detected components may be generated relative to the hand palm center and a component may be selected based on its distance to the hand palm center. The detected component with the shortest distance to the hand palm center may be the potential phone component, in some embodiments.

For a potential phone component(s), a principal component analysis (PCA) may be carried out (which is generally known to the skilled person), without limiting the present disclosure in that regard as any other analysis method may be utilized. The PCA may be indicative of contours and other metrics of the component (e.g. a surface property of the component).

In some embodiments, the time-of-flight object detection circuitry is further configured to: detect at least one mobile phone feature being indicative of the mobile phone based on the detection of the at least one hand feature in the object detection image.

For example, based on the potential phone component in combination with the above-described metrics (constituting a mobile phone feature), a mobile phone detection status (e.g. phone detection or no phone detection, or the like) may be determined. For example, if the metrics lie within a predetermined range, the mobile phone detection status may be positive (or negative).

In other words: In some embodiments, the time-of-flight object detection circuitry is further configured to: compare the at least one detected mobile phone feature with a predefined mobile phone feature.

For example, for each image (or for each frame), the phone detection status event may be stored (e.g. in a storage medium which may be part of the ToF object detection circuitry or may be an external storage). In some embodiments, after a predetermined number of positive mobile phone detection status events, a positive mobile phone detection status may be determined (and output, in some embodiments).

In some embodiments, the mobile phone detection status (if positive) is output together with a two-dimensional or three-dimensional mobile phone position per image or per frame.

Some embodiments pertain to a time-of-flight object detection method for detecting a mobile phone in a hand of a user of a vehicle, the time-of-flight object method including: detecting the mobile phone in the hand of the user based on a predefined reflectivity pattern being indicative of the mobile phone being at least partially located in the hand, as discussed herein.

The ToF object detection method may be carried out with ToF object detection circuitry according to the present disclosure, for example.

In some embodiments, the predefined reflectivity pattern is indicative of the mobile phone being at least partially surrounded by at least a part of the hand, as discussed herein. In some embodiments, the predefined reflectivity pattern is indicative of the mobile phone being at least partially occluded by at least a part of the hand, as discussed herein. In some embodiments, the time-of-flight object detection method further includes: generating a labeled time-of-flight image, as discussed herein. In some embodiments, the time-of-flight object detection method further includes: removing image elements of a time-of-flight image having a predefined reflectivity for generating the labeled time-of-flight image, as discussed herein. In some embodiments, the time-of-flight object detection method further includes: applying a morphological operation to the labeled time-of-flight image for generating an object detection image, as discussed herein. In some embodiments, the time-of-flight object detection method further includes: applying the morphological operation to an image element of the labeled time-of-flight image based on at least one surrounding image element for generating the object detection image, as discussed herein. In some embodiments, the time-of-flight object detection method further includes: detecting at least one hand feature being indicative of the hand in the object detection image, as discussed herein. In some embodiments, the time-of-flight object detection method further includes: detecting at least one mobile phone feature being indicative of the mobile phone based on the detection of the at least one hand feature in the object detection image, as discussed herein. In some embodiments, the time-of-flight object detection method further includes: comparing the at least one detected mobile phone feature with a predefined mobile phone feature, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is schematically depicted a cabin 1 of a vehicle including a stirring wheel S, a ToF system 2 including an iToF camera and ToF object detection circuitry according to the present disclosure. The iToF camera is adjusted such that an image of a scene 3 can be taken for carrying out a ToF object detection method can be carried out for the scene 3.

In the scene 3, an infotainment system 4 which is embedded in a dashboard 5, a hand 6, and a mobile phone 7 can be seen. In this case, the mobile phone 7 is detected in the hand 6 in a hundred consecutive frames, such that a wireless access from the mobile phone 7 to the infotainment system 4 is established based on the hundred positive phone detection status events.

Figure 2:
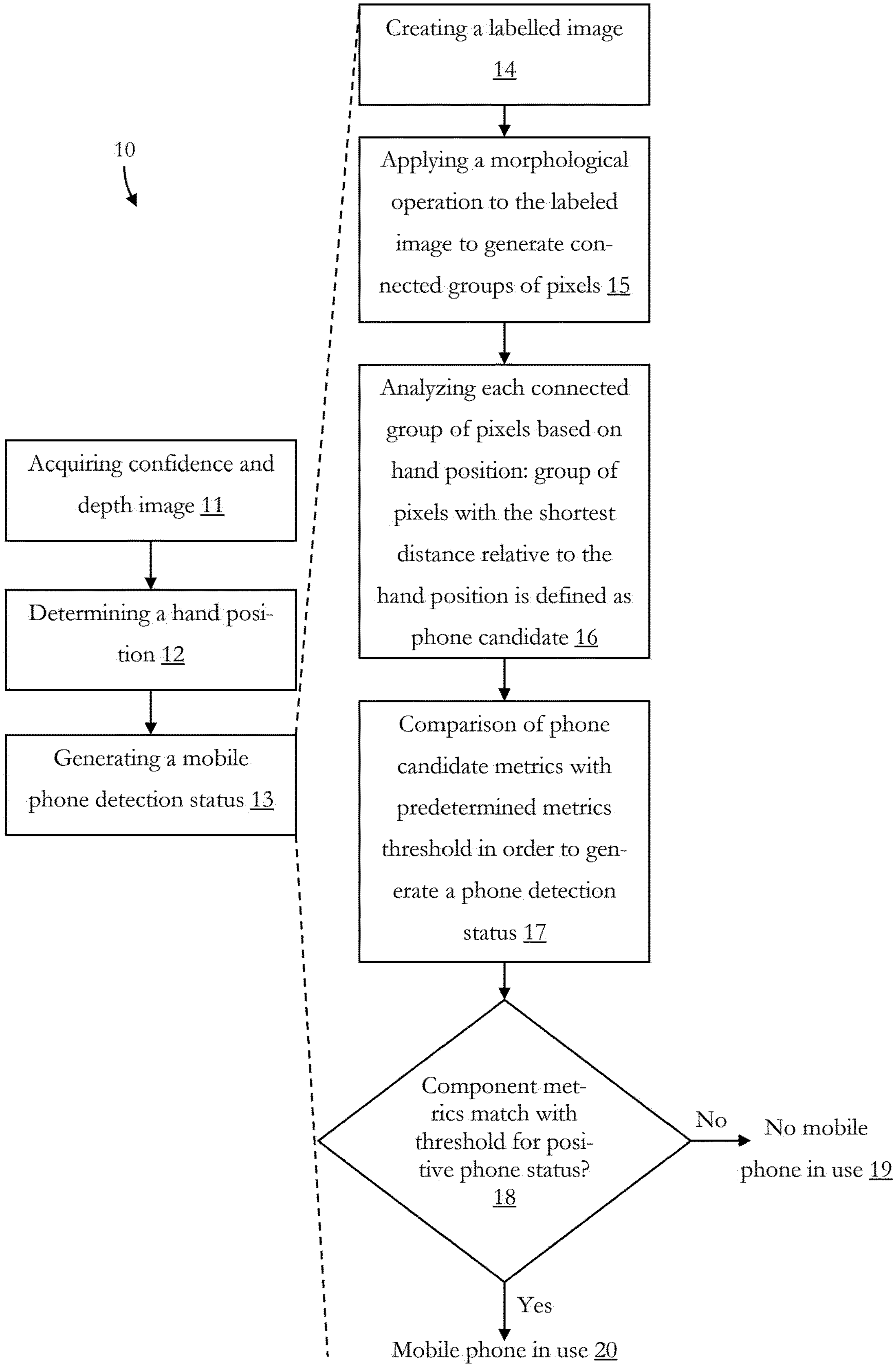
FIG. 2 depicts, in a block diagram, an object detection method according to the present disclosure.

FIG. 2 depicts, in a block diagram, an object detection method 10 according to the present disclosure, which is carried out by the ToF system 2 of FIG. 1.

At 11, a confidence and a depth image are acquired with the iToF camera.

At 12, a hand position is determined by ToF object detection circuitry.

At 13, a mobile phone detection status is generated based on the following:

For generating the mobile phone detection status, at 14, a labeled image is created based on a usability image and based on a pixel saturation, as discussed herein, wherein the present disclosure is not limited thereto.

At 15, a morphological operation is applied to the labeled image to generate connected groups of pixels based on neighboring pixel information, as discussed herein. In other words: components of the image are obtained, as discussed herein.

At 16, each connected group of pixels (i.e. each component) is analyzed based on the hand position, and the component with the shortest distance to the hand is defined as potential phone candidate, as discussed herein.

At 17, the phone candidate metrics are compared with predetermined metrics threshold for generating a phone detection status, as discussed herein.

At 18, it is decided whether the metrics match with the threshold. If they do not match, it is decided, at 19, that there is no mobile phone in use. If they do match, it is decided, at 20, that there is a mobile phone in use. Hence, then the mobile phone is detected in the hand of the user.

Figure 3:
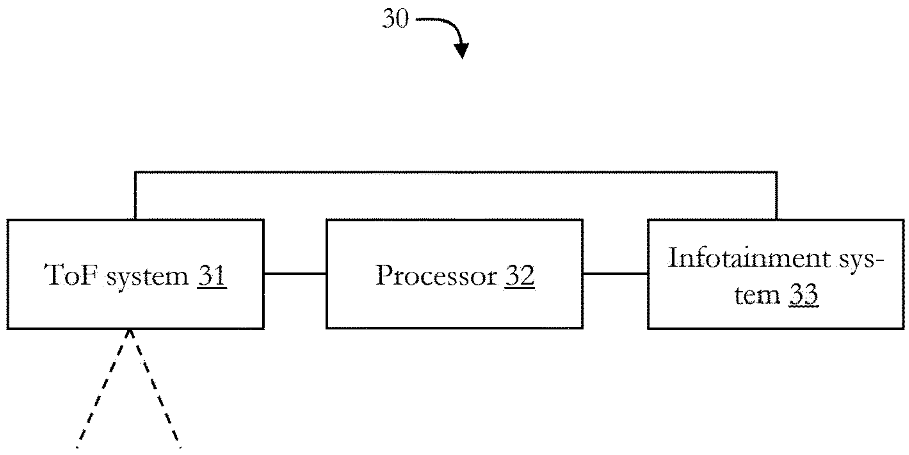
FIG. 3 depicts an embodiment of ToF object detection circuitry according to the present disclosure.

FIG. 3 depicts a further embodiment of ToF object detection circuitry 30 according to the present disclosure. The object detection circuitry 30 includes a ToF system 31, which is an iToF camera in this embodiment. Furthermore, a processor 32 is included which is configured to carry out an object detection method according to the present disclosure, such as the object detection method 35 and/or 40, which will be discussed under reference of FIGS. 4 and 5 or the object detection method as discussed under reference of FIG. 2.

Furthermore, the Tof object detection circuitry 30 includes an infotainment system 33 to which a connection can be established based on the decision of the processor 32 and based on the image of the ToF system 31. Furthermore, the infotainment system 33 can trigger the ToF system to obtaining an image, such that a method according to the present disclosure can be carried out based on the infotainment system.

Figure 4:
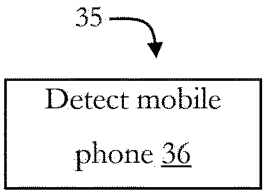
FIG. 4 depicts an embodiment of a ToF object detection method according to the present disclosure in a block diagram.

FIG. 4 depicts, in a block diagram, an embodiment of a ToF object detection method.

At 35, a mobile phone is detected in a hand of a driver based on a predefined reflectivity pattern which is indicative of the mobile phone being at least partially located in the hand, as discussed herein.

Figure 5:
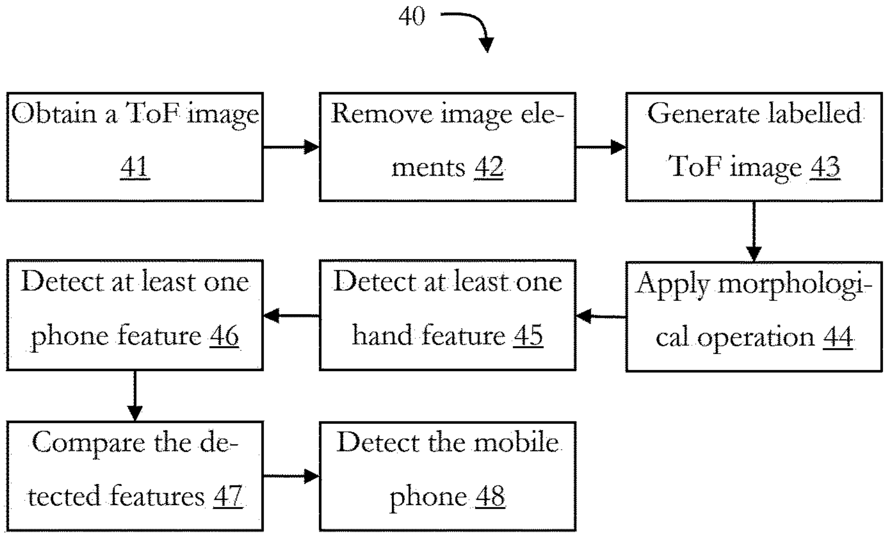
FIG. 5 depicts a further embodiment of a ToF object detection method according to the present disclosure in a block diagram.

FIG. 5 depicts, in a block diagram, a further embodiment of a ToF object detection method 40 according to the present disclosure.

At 41, a ToF image is obtained from a ToF camera.

At 42, image elements of the ToF image are removed based on their reflectivity, such that a usability image is generated, as discussed herein.

At 43, a labeled ToF image is generated based on at least one labelling condition, as discussed herein.

At 44, at least one morphological operation is applied for obtaining an object detection image, as discussed herein.

At 45, at least one hand feature is detected in the object detection image and at 46, at least one phone feature is detected in the object detection image.

At 47, the detected features are compared, as discussed herein.

At 48, the mobile phone is detected based on the comparison, as discussed herein.

FIG. **6*a* depicts an embodiment of a ToF object detection method 50** according to the present disclosure in terms of ToF images and respective processed ToF images.

A ToF depth image 51 is shown on the left, wherein different depth values are represented by different hashings of the image. As can be seen, hands 52, a mobile phone 53 and further objects are shown, as well. However, an object detection has not taken place yet.

A labeled image 55 is shown in the middle, which is labeled based on the ToF image 51, such that the background is detected and removed, as well as the further objects 54 are removed since their depth values are above a predetermined threshold. In the labeled image 55, different hashings represent different labels.

On the right, an object detection image 56 is shown which is based on a morphological operation of the labeled image 55. The object detection image represents a section of the original image, such that only the hands 52 and the mobile phone 53 can be seen, which are detected, such that the mobile phone 53 (which is circled to indicate the detection) is detected in the hand 52 (around which a rectangle is depicted to indicate the detection).

Figure 6A:
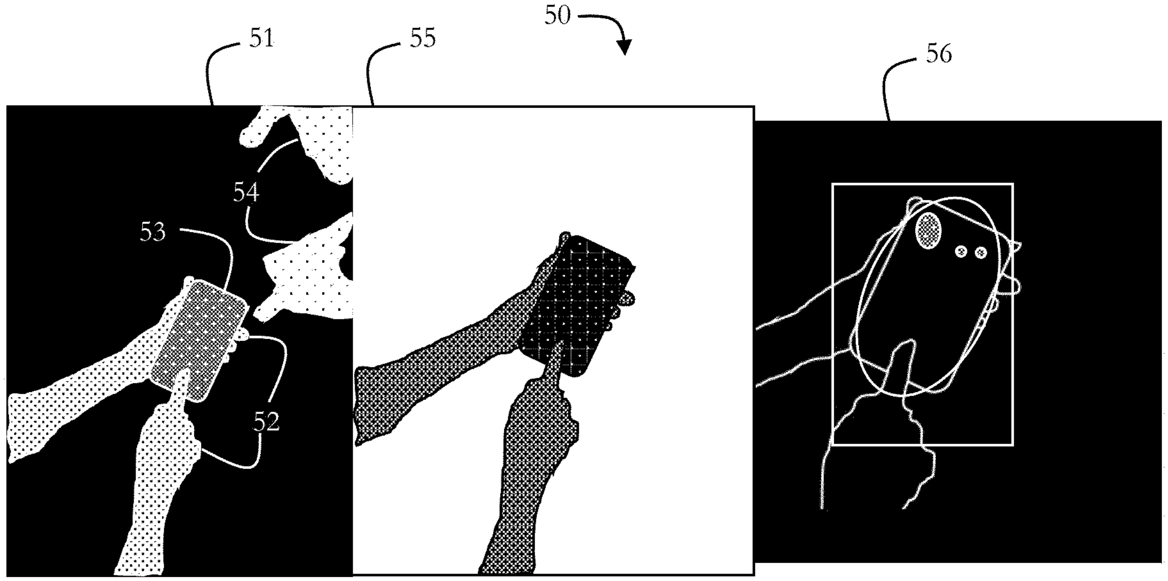
FIG. 6*a* depicts a further embodiment of a ToF object detection method according to the present disclosure.
Figure 6B:
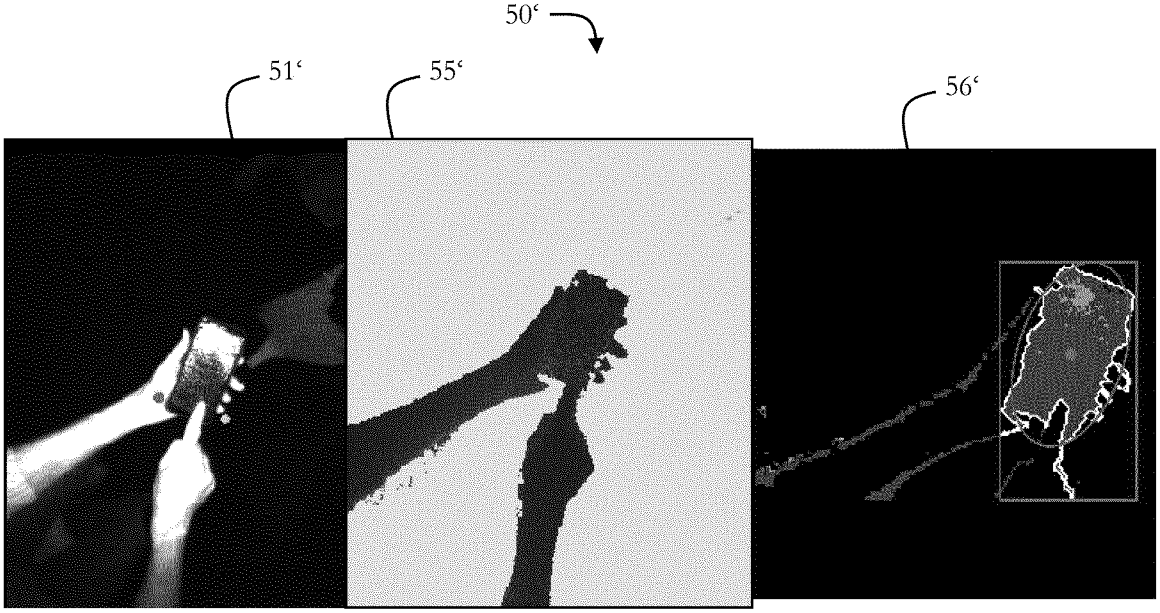
FIG. 6*b* depicts a further embodiment of a ToF object detection method according to the present disclosure.

FIG. **6*b* depicts an alternative representation of the ToF object detection method 50, namely as a ToF object detection method 50' in which a real ToF image 51', a real labeled image 55', and a real object detection image 56' is depicted. However, a repetitive description of the respective images is omitted, and it is referred to the description of FIG. 6*a***.

Figure 7:
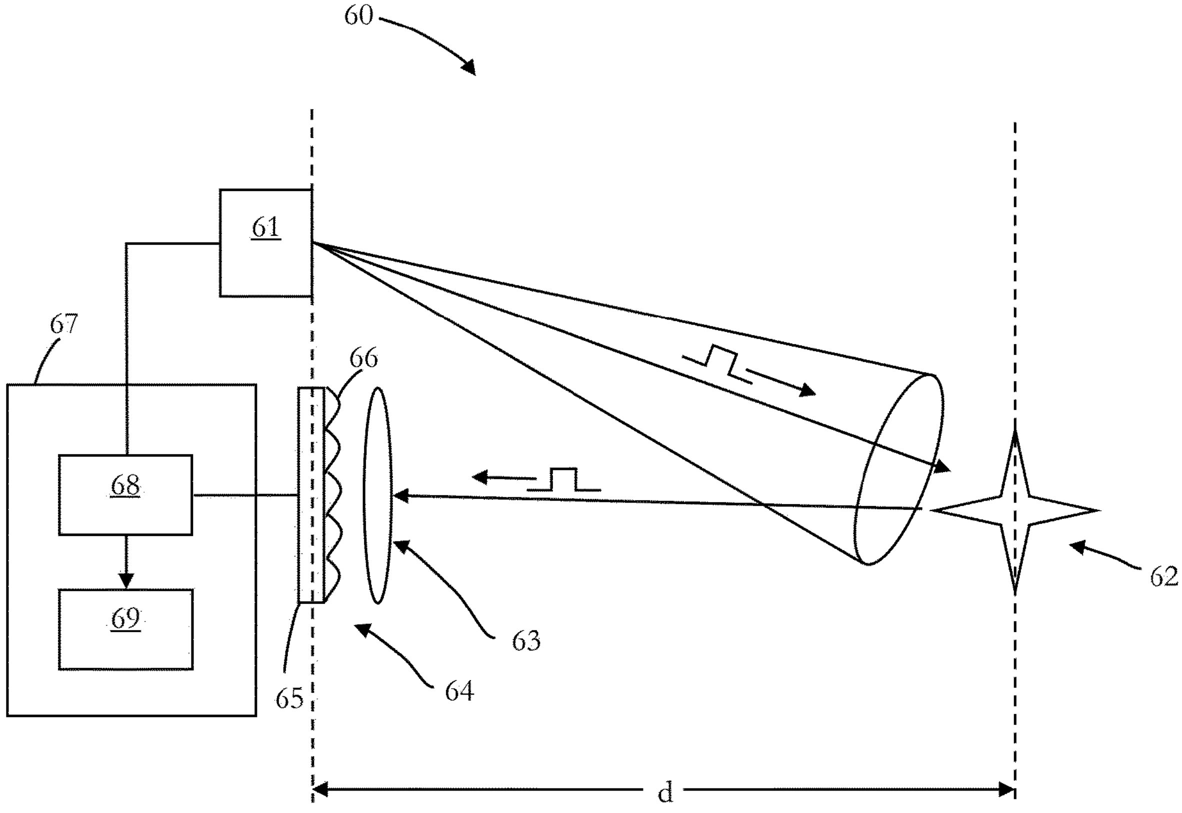
FIG. 7 illustrates an embodiment of a ToF imaging apparatus according to the present disclosure.

Referring to FIG. 7, there is illustrated an embodiment of a time-of-flight (ToF) imaging apparatus 60, which can be used for depth sensing or providing a distance measurement, in particular for the technology as discussed herein, wherein the ToF imaging apparatus 60 is configured as an iToF camera. The ToF imaging apparatus 60 has time-of-flight object detection circuitry 67, which is configured to perform the methods as discussed herein and which forms a control of the ToF imaging apparatus 60 (and it includes, not shown, corresponding processors, memory and storage, as it is generally known to the skilled person).

The ToF imaging apparatus 60 has a modulated light source 61 and it includes light emitting elements (based on laser diodes), wherein in the present embodiment, the light emitting elements are narrow band laser elements.

The light source 61 emits light, i.e. modulated light, as discussed herein, to a scene 62 (region of interest or object), which reflects the light. The reflected light is focused by an optical stack 63 to a light detector 64.

The light detector 64 has a time-of-flight imaging portion, as discussed herein, which is implemented based on multiple CAPDs formed in an array of pixels and a micro lens array 66 which focuses the light reflected from the scene 62 to the time-of-flight imaging portion 65 (to each pixel of the image sensor 65).

The light emission time and modulation information is fed to the time-of-flight object detection circuitry or control 67 including a time-of-flight measurement unit 68, which also receives respective information from the time-of-flight imaging portion 65, when the light is detected which is reflected from the scene 62. On the basis of the modulated light received from the light source 61, the time-of-flight measurement unit 68 computes a phase shift of the received modulated light which has been emitted from the light source 61 and reflected by the scene 62 and on the basis thereon it computes a distance d (depth information) between the image sensor 65 and the scene 65.

The depth information is fed from the time-of-flight measurement unit 68 to a 3D image reconstruction unit 69 of the time-of-flight object detection circuitry 67, which reconstructs (generates) a 3D image of the scene 62 based on the depth data. Moreover, object ROI detection, image labeling, applying a morphological operation, and mobile phone recognition, as discussed herein is performed.

The technology according to an embodiment of the present disclosure is applicable to various products. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 8:
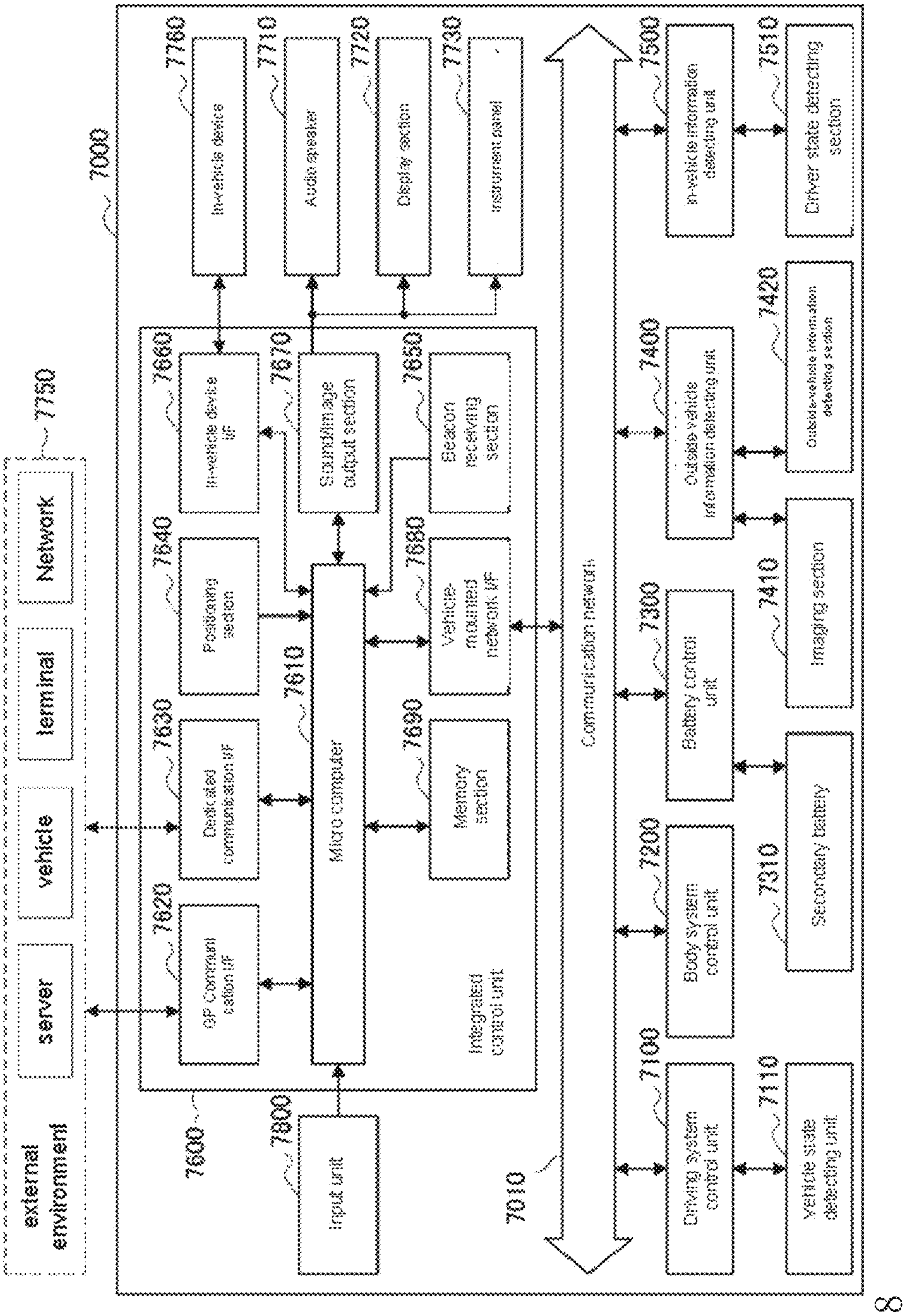
FIG. 8 is a block diagram depicting an example of schematic configuration of a vehicle control system.

FIG. 8 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 8, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 8 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 9:
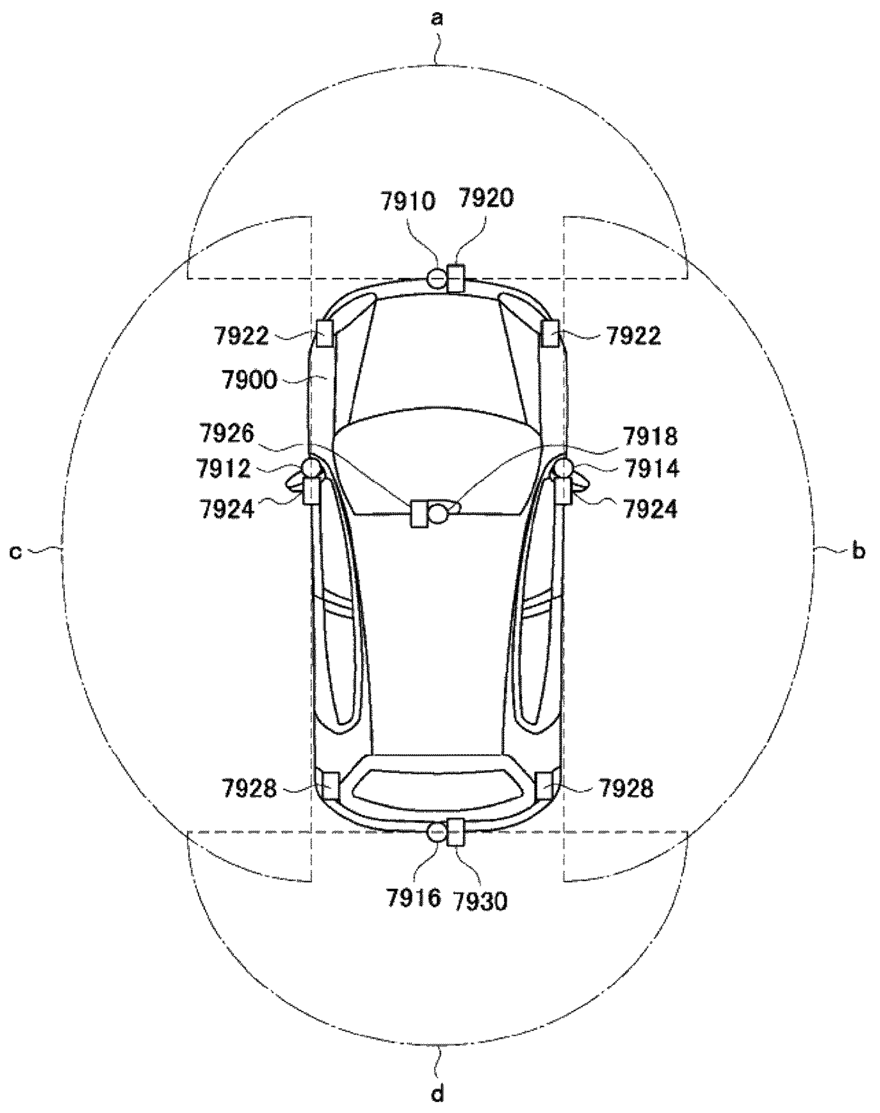
FIG. 9 is a diagram of assistance in explaining an example of installation positions of an outside-vehicle information detecting section and an imaging section.

FIG. 9 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 9 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 8, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 includes time-of-flight object detection circuitry according to the present disclosure and is configured to detect information about the inside of the vehicle. Furthermore, the in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit

7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 8, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 8 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of the time-of-flight object detection circuitry according to the present disclosure or realizing the time-of-flight object detection method according to the present disclosure can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In the vehicle control system 7000 described above, the time-of-flight object detection circuitry according to the present embodiment can be applied to the integrated control unit 7600 in the application example depicted in FIG. 8.

In addition, at least part of the constituent elements of the time-of-flight object detection circuitry may be implemented in a module (for example, an integrated circuit module formed with a single die) for the integrated control unit 7600 depicted in FIG. 8. Alternatively, the time-of-flight object detection circuitry may be implemented by a plurality of control units of the vehicle control system 7000 depicted in FIG. 8.

It should be recognized that the embodiments describe methods with an exemplary ordering of method steps. The specific ordering of method steps is however given for illustrative purposes only and should not be construed as binding. For example, the ordering of 45 and 46 in the embodiment of FIG. 5 may be exchanged. Other changes of the ordering of method steps may be apparent to the skilled person.

Furthermore, it should be recognized that the ToF object detection circuitry according to the present disclosure may be implemented based on existing (in-cabin) ToF equipment since it may only be necessary to process existing ToF data. In such a case, the ToF image processing pipeline may involve a filtering stage which may be a function of a targeted function. For example, the filtering stage of classical ToF image processing may degrade an image to such an extent that phone detection may become challenging. Due to black-coating of a phone, a reflectivity may generally be considered as low, such that "traditional" confidence-filtering and smoothing may leave an area corresponding to the mobile phone with too few pixels to be effectively used in the "classical" (known) detection pipeline.

For example, such an issue may be overcome by duplicating the pipeline before the filtering stage, such that a ToF object detection method according to the present disclosure may be applied based on raw/unfiltered image information, while continuing the "normal" pipeline, such that data from both pipelines may be combined for increasing a detection efficiency.

Please note that the division of the ToF object detection circuitry 30 into units 31 to 33 is only made for illustration purposes and that the present disclosure is not limited to any specific division of functions in specific units. For instance, the processor 32 may be a part of the ToF system 31 or it could be implemented by a respective programmed processor, field programmable gate array (FPGA) and the like, which would be configured to process a ToF acquisition and carry out a ToF object detection method according to the present disclosure.

A method for controlling an electronic device, such as ToF object detection circuitry 2, 30, or 67 discussed above, is described in the following and under reference of FIGS. 2, 4, 5, 6*a* and 6*b*. The method can also be implemented as a computer program causing a computer and/or a processor, such as processor 32 discussed above, to perform the method, when being carried out on the computer and/or processor, e.g. in a ToF camera. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Time-of-flight object detection circuitry for detecting a mobile phone in a hand of a user of a vehicle, the time-of-flight object detection circuitry being configured to:
detect the mobile phone in the hand of the user based on a predefined reflectivity pattern being indicative of the mobile phone being at least partially located in the hand.

(2) The time-of-flight object detection circuitry of (1), wherein the predefined reflectivity pattern is indicative of the mobile phone being at least partially surrounded by at least a part of the hand.

(3) The time-of-flight object detection circuitry of (1) or (2), wherein the predefined reflectivity pattern is indicative of the mobile phone being at least partially occluded by at least a part of the hand.

(4) The time-of-flight object detection circuitry of anyone of (1) to (3), further configured to: generate a labeled time-of-flight image.

(5) The time-of-flight object detection circuitry of (4), further configured to: remove image elements of a time-of-flight image having a predefined reflectivity for generating the labeled time-of-flight image.

(6) The time-of-flight object detection circuitry of (4) or (5), further configured to: apply a morphological operation to the labeled time-of-flight image for generating an object detection image.

(7) The time-of-flight object detection circuitry of (6), further configured to: apply the morphological operation to an image element of the labeled time-of-flight image based on at least one surrounding image element for generating the object detection image.

(8) The time-of-flight object detection circuitry of (6) or (7), further configured to: detect at least one hand feature being indicative of the hand in the object detection image.

(9) The time-of-flight object detection circuitry of (8), further configured to: detect at least one mobile phone feature being indicative of the mobile phone based on the detection of the at least one hand feature in the object detection image.

(10) The time-of-flight object detection circuitry of (9) further configured to: compare the at least one detected mobile phone feature with a predefined mobile phone feature.

(11) A time-of-flight object detection method for detecting a mobile phone in a hand of a user of a vehicle, the time-of-flight object method comprising:
detecting the mobile phone in the hand of the user based on a predefined reflectivity pattern being indicative of the mobile phone being at least partially located in the hand.

(12) The time-of-flight object detection method of (11), wherein the predefined reflectivity pattern is indicative of the mobile phone being at least partially surrounded by at least a part of the hand.

(13) The time-of-flight object detection method of (11) or (12), wherein the predefined reflectivity pattern is indicative of the mobile phone being at least partially occluded by at least a part of the hand.

(14) The time-of-flight object detection method of anyone of (11) to (13), further comprising: generating a labeled time-of-flight image.

(15) The time-of-flight object detection method of (14), further comprising: removing image elements of a time-of-flight image having a predefined reflectivity for generating the labeled time-of-flight image.

(16) The time-of-flight object detection method of (14) or (15), further comprising: applying a morphological operation to the labeled time-of-flight image for generating an object detection image.

(17) The time-of-flight object detection method of (16), further comprising: applying the morphological operation to an image element of the labeled time-of-flight image based on at least one surrounding image element for generating the object detection image.

(18) The time-of-flight object detection method of (16) or (17), further comprising: detecting at least one hand feature being indicative of the hand in the object detection image.

(19) The time-of-flight object detection method of (18), further comprising: detecting at least one mobile phone feature being indicative of the mobile phone based on the detection of the at least one hand feature in the object detection image.

(20) The time-of-flight object detection method of (19), further comprising: comparing the at least one detected mobile phone feature with a predefined mobile phone feature.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. Object detection circuitry for detecting a mobile phone in a hand of a user of a vehicle, the object detection circuitry being configured to:
detect infrared light indicative of reflectivity of an object, and
detect the mobile phone in the hand of the user based on a predefined reflectivity pattern and the detected infrared light, the predefined reflectivity pattern being based on an exterior material of the mobile phone, the reflectivity being indicative of the mobile phone being at least partially located in the hand,
wherein the exterior material includes a coating on a display of the mobile phone.

2. The object detection circuitry of claim 1, wherein the predefined reflectivity pattern is indicative of the mobile phone being at least partially surrounded by at least a part of the hand.

3. The object detection circuitry of claim 1, wherein the predefined reflectivity pattern is indicative of the mobile phone being at least partially occluded by at least a part of the hand.

4. The object detection circuitry of claim 1, further configured to distinguish the mobile phone in the hand of the user by labeling pixels generated by the detected infrared light by labeling image elements in an image based on the infrared light, the labeling being according to at least two different categories which the circuitry is configured to distinguish from the reflected infrared light.

5. The object detection circuitry of claim 4, further configured to use the labeling according to the at least two different categories to determine a region of interest comprising both an indication of the presence of a hand and the presence of a mobile phone.

6. An object detection method for detecting a mobile phone in a hand of a user of a vehicle, the object detection method comprising:

- detecting infrared light indicative of reflectivity of an object, and
- detecting the mobile phone in the hand of the user based on a predefined reflectivity pattern and the detected infrared light, the predefined reflectivity pattern being based on an exterior material of the mobile phone, the reflectivity being indicative of the mobile phone being at least partially located in the hand,
- wherein the exterior material includes a coating on a display of the mobile phone.

7. The object detection method of claim 6, wherein the predefined reflectivity pattern is indicative of the mobile phone being at least partially surrounded by at least a part of the hand.

8. The object detection method of claim 6, wherein the predefined reflectivity pattern is indicative of the mobile phone being at least partially occluded by at least a part of the hand.

9. The object detection method of claim 6, comprising distinguishing the mobile phone in the hand of the user by labeling pixels generated by the detected infrared light by labeling image elements in an image based on the infrared light, the labeling being according to at least two different categories which the circuitry is configured to distinguish from the reflected infrared light.

10. The time-of-flight object detection method of claim 9, further comprising:

- using the labeling according to the at least two different categories to determine a region of interest comprising both an indication of the presence of a hand and the presence of a mobile phone.

11. The object detection circuitry of claim 1, wherein the reflectivity of the object is based on a parameter indicative of reflectivity.

12. The object detection circuitry of claim 1, wherein reflectivity of the object is a signature for a surface of a mobile phone.

13. The object detection circuitry of claim 12, wherein signature is defined in the infrared range.

14. The object detection circuitry of claim 1, wherein the detected infrared light is light emitted by time of flight circuitry.

15. The object detection circuitry of claim 1, wherein the circuitry uses the reflectivity pattern to distinguish, in low-light conditions, the mobile phone from background features that also reflect the infrared light.

16. The object detection circuitry of claim 1, wherein the circuitry is configured to output the detection of the mobile phone in the hand of the user for translation by circuitry into as operator warning.

17. The object detection method of claim 6, comprising outputting the detection of the mobile phone in the hand of the user for translation by circuitry into as operator warning.

18. The object detection circuitry of claim 1, wherein the coating includes a plurality of different coatings.

19. The object detection circuitry of claim 18, wherein the mobile phone includes at least one region without a coating.

* * * * *